(No Model.)
O. C. FENLASON.
MACHINE FOR CUTTING ROUND BLOCKS.
No. 363,222. Patented May 17, 1887.
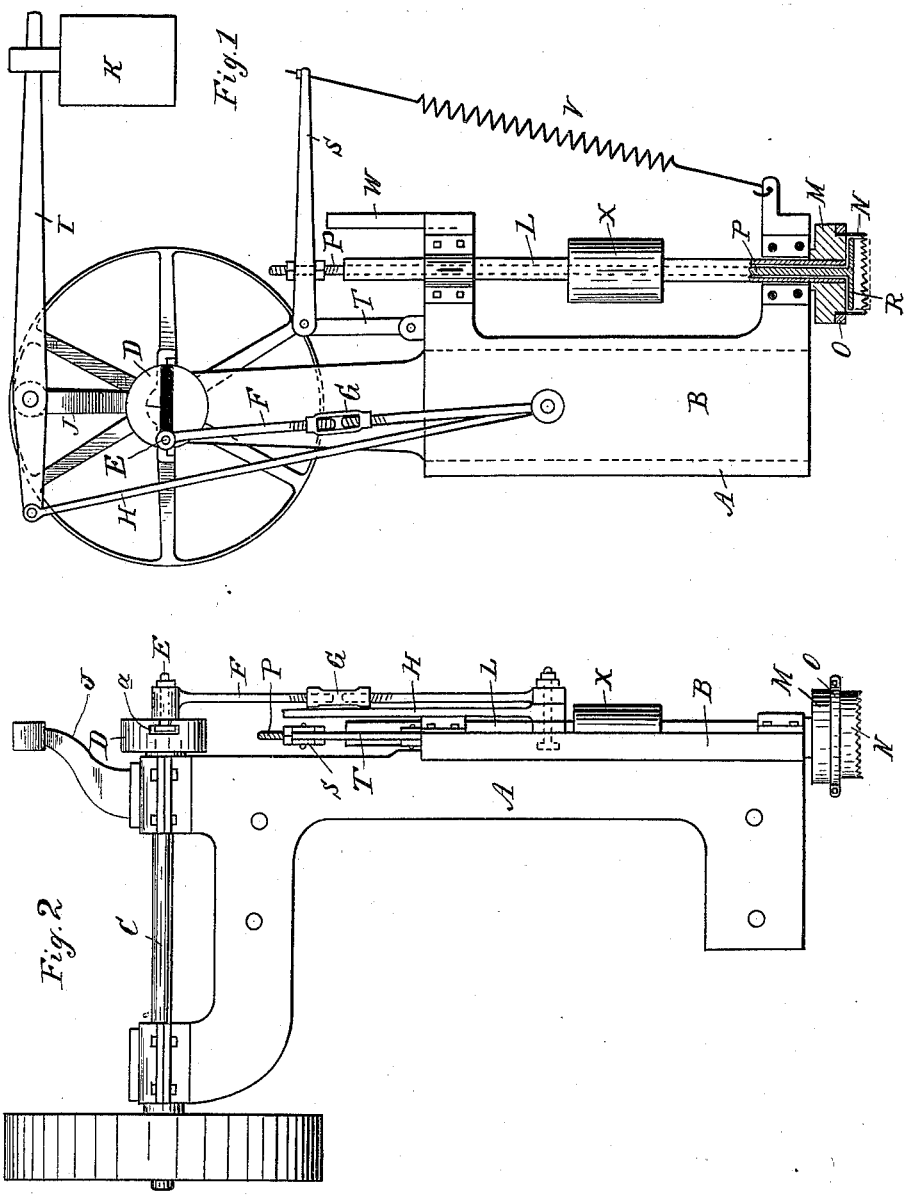
Attest:
John Schuman.
E. Scully.
Inventor:
Orrin C. Fenlason.
by his Att'y
Thos. S. Sprague

UNITED STATES PATENT OFFICE.

ORRIN C. FENLASON, OF MONTAGUE, MICHIGAN.

MACHINE FOR CUTTING ROUND BLOCKS.

SPECIFICATION forming part of Letters Patent No. 363,222, dated May 17, 1887.

Application filed December 23, 1886. Serial No. 222,403. (No model.)

*To all whom it may concern:*

Be it known that I, ORRIN C. FENLASON, of Montague, in the county of Muskegon and State of Michigan, have invented new and useful Improvements in Machines for Cutting Round Blocks or Heading; and I do hereby declare that the following is a full, clear, and exact description thereof, reference being had to the accompanying drawings, which form a part of this specification.

This invention relates to certain new and useful improvements in machines for cutting round blocks or heading.

The invention consists in the peculiar construction of and means employed for actuating a crown-saw, in the means employed for the adjustment of parts, and in the peculiar construction, arrangement, and combination of the various parts, all as more fully hereinafter set forth.

Figure 1 is a front elevation of my improved machine. Fig. 2 is a side elevation of the same.

In the accompanying drawings, which form a part of this specification, A represents a suitable frame provided with proper guides, upon which the table B has a reciprocating motion.

Journaled in proper bearings in the frame A is a shaft, C, adapted to be rotated from any convenient power. To the front end of this shaft C is secured a disk, D, in the face of which is formed an undercut slot, a, to receive the head of the crank-pin E, which latter is connected, by means of the connecting-rod F, to the table B. This connecting-rod is made in two sections connected together by a turn-buckle, G, by means of which such rod may be lengthened or shortened in adjusting the crank-pin to or from the center for the purpose of regulating the length of stroke or stride of the table.

H is a rod connecting the table B with one end of the lever I, fulcrumed to a stand, J, rising from the frame, the free end of such lever carrying a counter-weight, K.

L is a hollow arbor journaled in proper bearings in the table B, and to the lower end of this arbor is secured a flanged circular head, M. Around this flanged head I bend a saw, N, which is secured in place by a clamp-band, O.

P is a rod within the hollow arbor L, and has secured to its lower end a disk or head, R, within the circle of the saw. The upper end of this rod P is secured to a lever, S, one end of which is connected by means of the link T to the table B, while its opposite end is connected by a coil-spring, V, to the lower end of the table, the depression of the lever S, under the tension of the spring, being regulated by an adjustable stop, W, secured to the table.

In practice the material to be operated upon is placed upon a proper table beneath the saw N, which latter is rotated by means of a belt upon the pulley X, from any suitable power. The shaft C being in motion, causes the table to gradually advance till the saw in its rotation has cut the circular block, the advance of the table and its connections being regulated through the medium of the connecting-rod F and movable crank-pin. As the block is cut and projects into the circle formed by the saw the disk R and its rod are forced upward against the resistance of the spring, and as the table and saw recede, as in the upstroke, the rod and disk, under the action of the spring, force the cut block out of the saw.

The retrograde movement of the table is materially assisted by the counterweighted lever.

What I claim as my invention is—

1. The combination, with reciprocating carriage B and the hollow arbor L, journaled in bearings therein, of the rod P within said arbor, the lever S, fulcrumed on the upper end of said rod, the link T, connecting one end of said lever with the upper part of the carriage, and the spring V, connecting the other end of said lever with the lower end of said carriage, substantially as and for the purpose specified.

2. The combination, with the reciprocating carriage B and the hollow arbor L, journaled in bearings therein, of the rod P within said arbor, the lever S, fulcrumed on the upper end of said rod, the link T, connecting one end of said lever with the upper part of the carriage, and the spring V, connecting the other end of said lever with the lower end of said carriage, and the stop W on the upper end of the carriage in the path of said lever, substantially as and for the purpose specified.

3. The combination, with the frame A, carriage B, the arbor L, journaled in bearings in said carriage, and the saw carried by said arbor, of the shaft C, slotted disk D thereon, rod F, crank-pin E thereon and engaging the slot of said disk, lever I, rod H, connecting the carriage with said lever, and the weight K on said lever, substantially as described.

4. In combination with a frame, A, a reciprocating table, B, connected to the main driving-shaft C by means of an adjustable connecting-rod, F, and crank-pin E, rod H, lever I, and weight K, substantially as and for the purposes specified.

ORRIN C. FENLASON.

Witnesses:
EDWARD LEEDOM,
JAMES D. WILSON.